United States Patent
Jacobus et al.

(10) Patent No.: US 10,343,788 B2
(45) Date of Patent: Jul. 9, 2019

(54) TELESCOPING REFUELING BOOM CONTROL SYSTEMS AND METHODS

(71) Applicant: The Boeing Company, Chicago, IL (US)

(72) Inventors: Christopher M. Jacobus, Creve Coeur, MO (US); Blain A. Lawson, Saint Louis, MO (US); Ian A. Halley, Chesterfield, MO (US); Jung Soon Jang, Bellevue, WA (US); Kimberly A. Hinson, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 15/716,151

(22) Filed: Sep. 26, 2017

(65) Prior Publication Data

US 2019/0092486 A1    Mar. 28, 2019

(51) Int. Cl.
| | | |
|---|---|---|
| *G05D 3/12* | (2006.01) | |
| *B64D 39/02* | (2006.01) | |
| *B64D 39/04* | (2006.01) | |
| *G05B 11/01* | (2006.01) | |
| *G05D 13/02* | (2006.01) | |

(52) U.S. Cl.
CPC ............. *B64D 39/02* (2013.01); *B64D 39/04* (2013.01); *G05B 11/01* (2013.01); *G05D 3/127* (2013.01); *G05D 13/02* (2013.01)

(58) Field of Classification Search
CPC ........ B64D 39/02; B64D 39/04; G05B 11/01; G05D 3/127; G05D 13/02
USPC ....................................................... 701/36, 50
See application file for complete search history.

(56) References Cited

U.S. PATENT DOCUMENTS

| | | | |
|---|---|---|---|
| 3,091,419 A | 5/1963 | Mosher | |
| 8,683,795 B1 * | 4/2014 | Beck ...................... | B64D 39/02 60/468 |
| 2011/0180666 A1 * | 7/2011 | Speer ..................... | B64D 39/00 244/135 A |

FOREIGN PATENT DOCUMENTS

| | | |
|---|---|---|
| EP | 2690019 | 1/2014 |
| WO | WO 2010/059155 | 5/2010 |
| WO | WO 2010/065036 | 6/2010 |
| WO | WO 2013/016173 | 1/2013 |

* cited by examiner

*Primary Examiner* — Gertrude Arthur Jeanglaude
(74) *Attorney, Agent, or Firm* — Haynes and Boone, LLP

(57) ABSTRACT

Systems and methods according to one or more embodiments are provided for rate and position control modes used in the operations of a telescoping refueling boom system. In one example, a system includes a telescoping tube and an actuator coupled to the telescoping tube and configured to extend and/or retract the telescoping tube. A processor is coupled to the actuator and configured to select a telescoping tube rate control mode and/or a telescoping tube position control mode based on a telescoping tube current position error, a telescoping tube current rate of movement, and a value of a telescoping tube rate command.

20 Claims, 4 Drawing Sheets

TELESCOPING REFUELING BOOM CONTROL SYSTEMS AND METHODS

STATEMENT REGARDING FEDERALLY SPONSORED RESEARCH OR DEVELOPMENT

This invention was made with Government support under contract number FA8625-11-C-6600 awarded by the Department of Defense. The Government has certain rights in this invention.

TECHNICAL FIELD

One or more embodiments relate generally to aircraft refueling systems, and more particularly, for example, to control of an aircraft telescoping refueling boom.

BACKGROUND

In the field of aircraft in-flight refueling, there is an ongoing effort to improve operation of modern refueling booms. For example, some conventional systems utilize telescope position control feedback exclusively during free air maneuvering and during fueling when the boom is in contact with a receiver aircraft. Conventional telescope position control feedback may result in large command-to-position errors while the boom is in contact with a receiver aircraft. To negate these large command-to-position errors, a conventional position control loop utilizes a contact mode in which the telescope is allowed to move freely with the receiver aircraft while in contact. However, a contact mode may not be sufficient for modern telescoping refueling boom actuators. Moreover, relying on telescope rate control feedback alone may result in telescoping tube movement even in the absence of an operator provided command, resulting in telescoping tube drift. Thus, there is a need to provide improved control of a telescoping refueling boom system during in-flight aircraft refueling operations.

SUMMARY

Systems and methods are disclosed herein in accordance with one or more embodiments that provide for an improved approach to operating a telescoping refueling boom system. In some embodiments, rate and position control modes are used in the operations. In one example, a telescoping tube rate control mode provides for extension and/or retraction of a telescoping tube in response to an aerial refueling operator input. Telescoping tube rate control mode includes features that map the operator input into a commanded tube rate. In another example, a telescoping tube position control mode provides for holding a constant telescoping tube length, such as when the boom is flown while not in contact with a receiver aircraft, for example. The telescoping tube position control mode remains active until a telescoping tube position error threshold limit is exceeded (e.g., a receiver aircraft displaces the telescoping tube while in contact) or a non-zero tube rate command is executed, for example. The telescoping tube position control mode is then deactivated, and the operation transitions to the telescoping tube rate control mode.

In one embodiment, a system includes a telescoping tube; an actuator coupled to the telescoping tube and configured to extend and/or retract the telescoping tube; and a processor coupled to the actuator and configured to select a telescoping tube rate control mode and/or a telescoping tube position control mode based on a telescoping tube current position error, a telescoping tube current rate of movement, and a value of a telescoping tube rate command.

In another embodiment, a method includes determining whether a telescoping tube current position error is within a telescoping tube position error threshold limit; determining whether a telescoping tube current rate of movement is within a telescoping tube rate threshold limit; determining whether a telescoping tube rate command is an approximately zero value; and selecting a telescoping tube rate control mode and/or a telescoping tube position control mode based on the telescoping tube current position error, the telescoping tube current rate of movement, and the telescoping tube rate command.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

DETAILED DESCRIPTION

Systems and methods are provided in accordance with one or more embodiments that provides for selecting a telescoping tube rate control mode and/or a telescoping tube position control mode based on specific control mode criteria. In some embodiments, telescoping tube rate and position control modes are used for the control of a telescoping refueling boom system during in-flight aircraft refueling operations. Rate and position control modes are determined based on several mode criteria, as discussed herein. For example, rate control mode may be initiated by a user input to a telescoping tube control stick to extend or retract a telescoping tube in response to the user input. Position control mode may be initiated when the telescoping tube position is held at a fixed value.

Several system feedback criteria are used to determine when the telescoping refueling boom system transitions between the rate control and the position control modes. For example, in some embodiments, if it is determined that a telescoping tube current position error is exceeded during position control mode, telescoping refueling boom system transitions to rate control mode, as discussed herein. In some embodiments, telescoping refueling boom system transitions from a rate control mode to a position control mode when a current telescoping tube rate command is a zero value within a telescoping tube control stick dead band, as discussed herein. These examples are not intended to be exhaustive and additional feedback criteria and mode transitions are discussed further herein.

Figure 1:
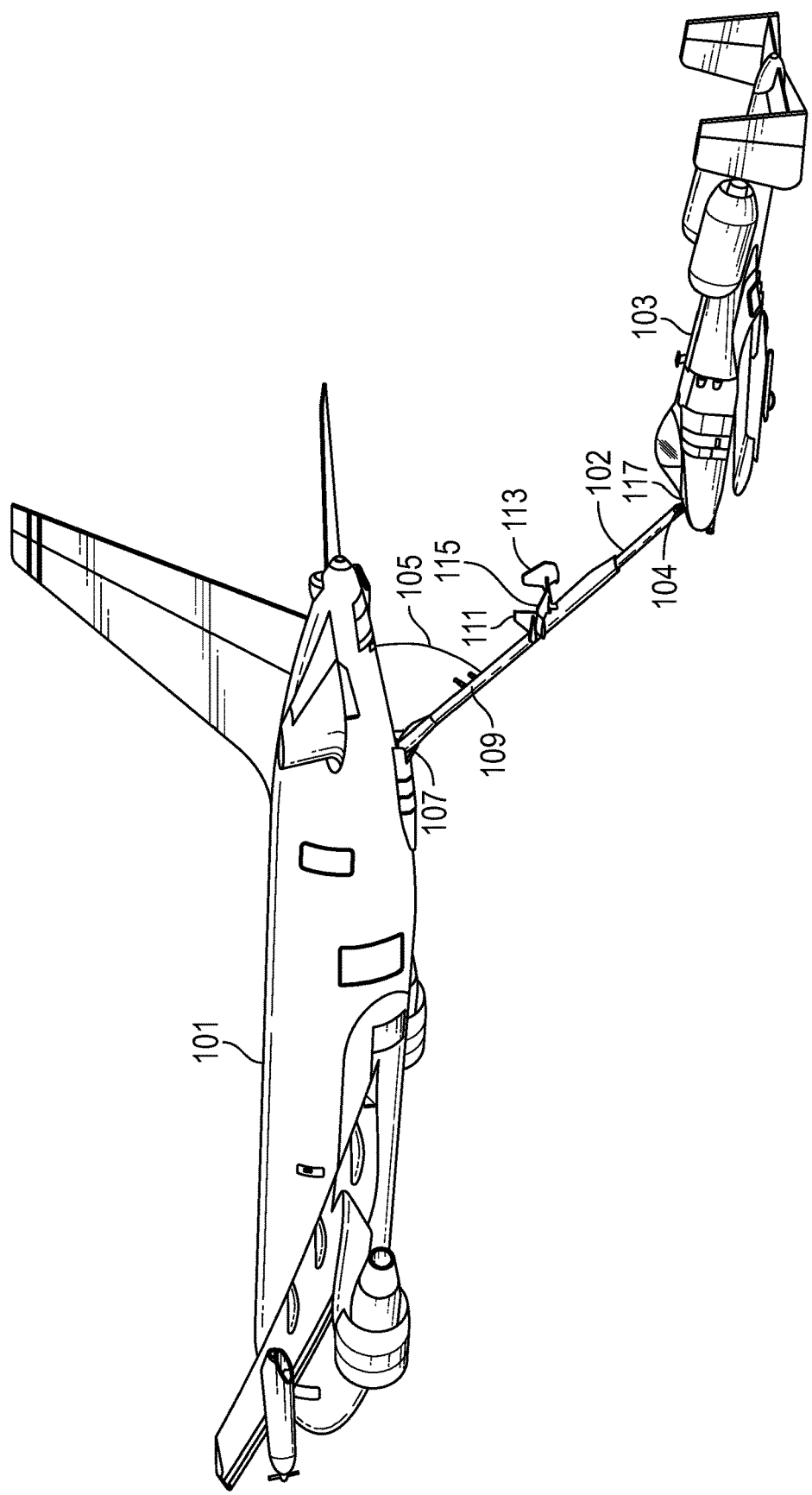
FIG. 1 illustrates a diagram of an aircraft refueling scene in accordance with an embodiment of the disclosure.

FIG. 1 illustrates a diagram of an aircraft refueling scene in accordance with an embodiment of the disclosure. As shown in FIG. 1, a tanker aircraft 101 is transferring fuel to a receiver aircraft 103. Fuel is transferred from tanker aircraft 101 to receiver aircraft 103 through a telescoping tube 102 that forms part of a telescoping refueling boom system (such as telescoping refueling boom system 100 of FIG. 2). Telescoping tube 102 is mechanically supported within a fixed tube 109 (e.g., a boom). Fixed tube 109 includes control surfaces such as a left rudder 111, a right rudder 113, and an elevator 115 to control a roll and pitch of fixed tube 109. In some embodiments, fixed tube 109 is hinged at a rear fuselage 107 of tanker aircraft 101 and a hoist cable 105 is used to assist control surfaces at low air speeds to deploy fixed tube 109 from rear fuselage 107 and stow fixed tube 109 at rear fuselage 107 when control surfaces are not active.

In some embodiments, telescoping tube 102 extends and/or retracts along fixed tube 109 to place a boom nozzle 104 into a receptacle 117 of receiver aircraft 103. In some embodiments, telescoping tube 102 is extended and/or retracted by a hydraulic actuator (e.g., such as actuator 231 of FIG. 2) containing a main control valve (MCV) which is controlled by a direct drive electric motor (DDV).

In various embodiments, servo actuator control laws utilize a high bandwidth valve position control loop for the main control valve to control a position of telescoping tube 102. A lower bandwidth outer loop controls an extension and retraction of telescoping tube 102 based on a telescoping tube rate command provided by a telescoping tube control stick (e.g., such as telescoping tube control stick 232 of FIG. 2). In this regard, both position and rate feedback control loops are incorporated to robustly control telescoping refueling boom system 100 under all boom states including extending, retracting, and holding position of telescoping tube 102.

Figure 2:
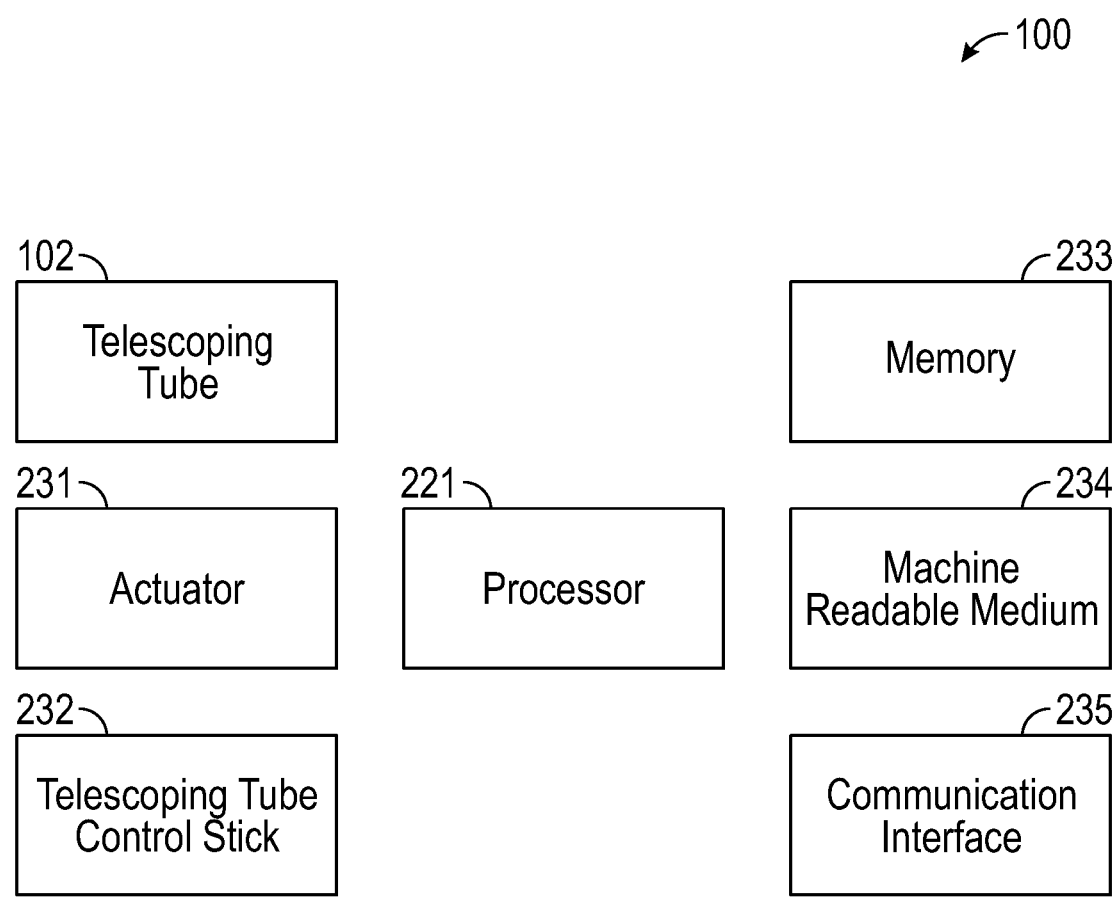
FIG. 2 illustrates a block diagram of a telescoping refueling boom system in accordance with an embodiment of the disclosure.

FIG. 2 illustrates a block diagram of a telescoping refueling boom system 100 in accordance with an embodiment of the disclosure. In some embodiments, telescoping refueling boom system 100 is utilized to accurately control telescoping tube 102 during extension and retraction, and to arrest telescoping tube 102 drift. In various embodiments, components of telescoping refueling boom system 100 are provided in tanker aircraft 101, for example. In other embodiments, telescoping refueling boom system 100 is provided in other types of fixed wing aircraft. In one embodiment, telescoping refueling boom system 100 includes telescoping tube 102, a processor 221, an actuator 231, and telescoping tube control stick 232.

Processor 221 includes, for example, a microprocessor, a single-core processor, a multi-core processor, a microcontroller, an application-specific integrated circuit (ASIC), a logic device (e.g., a programmable logic device configured to perform processing operations), a digital signal processing (DSP) device, one or more memories for storing executable instructions (e.g., software, firmware, or other instructions), and/or any other appropriate combination of processing device and/or memory to execute instructions to perform any of the various operations described herein. Processor 221 is adapted to interface and communicate with actuator 231, telescoping tube control stick 232, and memory 233 via a communication interface 235 to perform method and processing steps as described herein. In this regard, processor communicates with actuator 231 to select a telescoping tube rate control mode and/or a telescoping tube position control mode based on a telescoping tube current position error, a telescoping tube current rate of movement, and a value of a telescoping tube rate command, as discussed herein.

In various embodiments, it should be appreciated that processing operations and/or instructions are integrated in software and/or hardware as part of processor 221, or code (e.g., software or configuration data) which is stored in memory 233. Embodiments of processing operations and/or instructions disclosed herein are stored by a machine readable medium 234 in a non-transitory manner (e.g., a memory, a hard drive, a compact disk, a digital video disk, or a flash memory) to be executed by a computer (e.g., logic or processor-based system) to perform various methods disclosed herein. In one or more embodiments, the machine readable medium 234 is included as part of processor 221.

Memory 233 includes, in one embodiment, one or more memory devices (e.g., one or more memories) to store data and information. The one or more memory devices includes various types of memory including volatile and non-volatile memory devices, such as RAM (Random Access Memory), ROM (Read-Only Memory), EEPROM (Electrically-Erasable Read-Only Memory), flash memory, or other types of memory. In one embodiment, processor 221 is adapted to execute software stored in memory 233 to perform various methods, processes, and operations in a manner as described herein. In various embodiments, memory 233 stores a current position of telescoping tube 102, a telescoping tube position error threshold limit, and/or a telescoping tube rate threshold limit, as discussed herein.

Communication interface 235 includes wired or wireless communication buses within tanker aircraft 101. In some embodiments, communication interface provides a wired communication interface 235 between processor 221, memory 233, actuator 231, and telescoping tube control stick 232. In some embodiments, a wired communication interface 235 is implemented as an ARINC 429 data bus. In other embodiments, a wired communication, interface 235 is implemented as a Mil-Std-1553 data bus, an Ethernet connection, or other wired communication interface 235 data bus connections. In some embodiments, a wireless communication interface 235 is implemented as a secure wireless local area network (WLAN) component based on the IEEE 802.11 standards, a wireless broadband component, a wireless satellite component, or various other types of wireless communication components including radio frequency (RF), microwave frequency (MWF), and/or infrared frequency (IRF) components adapted for communication between a user (e.g., an ARO) and other members of tanker aircraft 101 and/or receiver aircraft 103.

In some embodiments, actuator 231 is implemented as a hydraulic actuator 231 to provide a hydraulic drive to extend and/or retract telescoping tube 102. In this regard, a hydraulic flow, as controlled by main control valve (MCV) of actuator 231, moves through actuator 231 of the drive system to cause telescoping tube 102 to move. In some embodiments, direct drive electric motor (DDV) of actuator 231 controls a displacement of MCV to control a rate of hydraulic flow that controls telescoping tube 102 rate of movement.

In some embodiments, telescoping tube control stick 232 is implemented as an electronic circuit capable of converting an aerial refueling operator (ARO) input into an electrical signal to control actuator 231. In this regard, the ARO provides a user input to telescoping tube control stick 232 to command a telescoping tube rate and telescoping tube control stick 232 generates a telescoping tube rate command for actuator 231 to extend and/or retract telescoping tube 102 in response to the user input.

Figure 3:
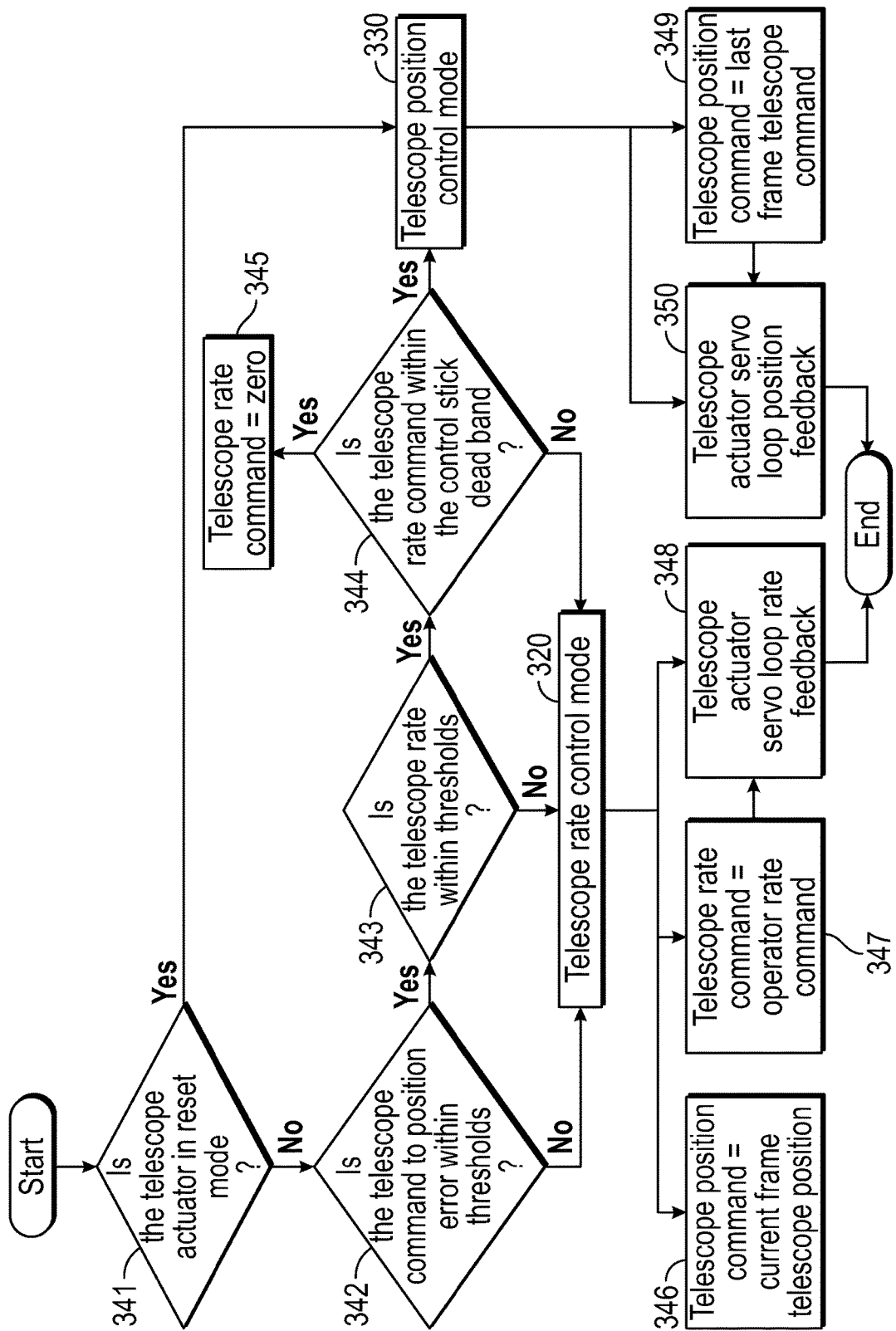
FIG. 3 illustrates a process flow of a telescoping tube control mode selection in accordance with an embodiment of the disclosure.

FIG. 3 illustrates a process flow of a telescoping tube control mode selection in accordance with an embodiment of the disclosure. In this regard, the process flow provides for selecting a telescoping tube rate control mode and/or a telescoping tube position control mode based on several mode transition criteria as discussed herein.

The process flow starts at block 341 where processor 221 determines if actuator 231 is reset, such as when telescoping refueling boom system 100 is initializing or when actuator 231 is recovering from a fault condition. If processor 221 determines actuator 231 is reset, the process flow moves to block 330, and telescoping refueling boom system 100 transitions to telescoping tube position control mode.

If processor 221 determines actuator 231 is not reset, process flow moves to block 342. In block 342, processor 221 determines if a telescoping tube position error threshold limit is exceeded. For example, telescoping tube position error threshold limit provides for a maximum allowable uncommanded telescoping tube displacement. In one non-limiting example, the maximum allowable uncommanded telescoping tube displacement is approximately minus two inches to plus two inches, however, other maximum uncommanded telescoping tube displacement values are possible in other embodiments. If the telescoping tube position error threshold limit is exceeded, the process flow moves to block 320, and telescoping refueling boom system 100 transitions to telescoping tube rate control mode.

If processor 221 determines the telescoping tube position error threshold limit is not exceeded, the process flow moves to block 343. In block 343, processor 221 determines if a telescoping tube rate threshold limit is exceeded. For example, telescoping tube rate threshold limit provides for a maximum telescoping tube rate of movement. In one non-limiting example, the maximum telescoping tube rate of movement is approximately minus three inches/second to plus three inches/second, however, other maximum telescoping tube rate values are possible in other embodiments. Processor 221 is configured to select the telescoping tube rate control mode when a telescoping tube current rate of movement exceeds the telescoping tube rate threshold limit. If the telescoping tube rate threshold limit is exceeded, the process flow moves to block 320, and telescoping refueling boom system 100 transitions to telescoping tube rate control mode.

If processor 221 determines the telescoping tube rate threshold limit is not exceeded, the process flow moves to block 344. In block 344, processor 221 determines if the telescoping tube rate command is a non-zero value. If the telescoping tube rate command is a zero value within a telescoping tube control stick 232 dead band, the process flow moves to block 330, and telescoping refueling boom system 100 transitions to telescoping tube position control mode. At block 345, processor 221 sets the telescoping tube rate command to zero. In block 349, processor 221 sets the telescoping tube 102 position command to a constant value (e.g., by setting an actuator position command) equal to the tube length at the time of telescoping tube position control mode activation.

In block 350, an actuator 231 servo loop position feedback is used to monitor that telescoping tube 102 remains within the telescoping tube position error threshold limit. During the time period telescoping tube 102 position is held constant in position control mode, it is possible for receiver aircraft 103 in contact with telescoping tube 102 to drive large telescoping tube 102 position errors. In order to minimize that error, processor 221 deactivates position control mode when receiver aircraft 103 moves beyond the telescoping tube position error threshold limit or, more generally, when excessive position error has been generated. In this regard, similar to block 342, if the telescoping tube position error threshold limit is exceeded, the process flow moves to block 320, and telescoping refueling boom system 100 transitions to telescoping tube rate control mode.

If, at block 344, the telescoping tube rate command is a non-zero value, the process flow moves to block 320, and telescoping refueling boom system 100 transitions to telescoping tube rate control mode. For all conditions when telescoping tube rate control mode is activated (e.g., as discussed herein for blocks 342, 343, and 344), the process flow moves to block 346.

In block 346, processor 221 sets the telescoping tube 102 position command to a position equal to the current tube length. In this regard, when the telescoping tube rate control mode is selected, processor 221 sets an actuator position command to a telescoping tube 102 position equal to the telescoping tube 102 current position. In block 347, a telescoping tube rate is set equal to a telescoping tube rate command responsive to the user input. In block 348, an actuator 231 servo loop rate feedback is used to control the rate of telescoping tube 102 based on an operator input command generated using the telescoping tube control stick 232.

Figure 4A:
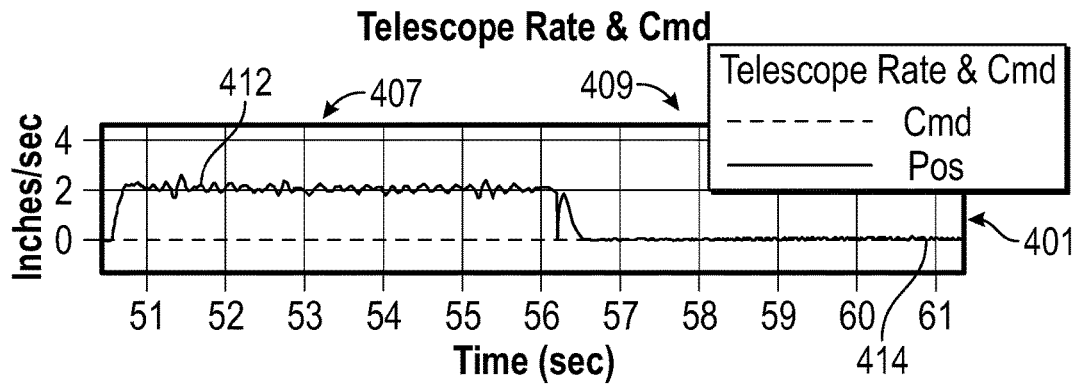
FIGS. 4A-C illustrate plots of an operating telescoping refueling boom system in accordance with one or more embodiments of the disclosure.
Figure 4B:
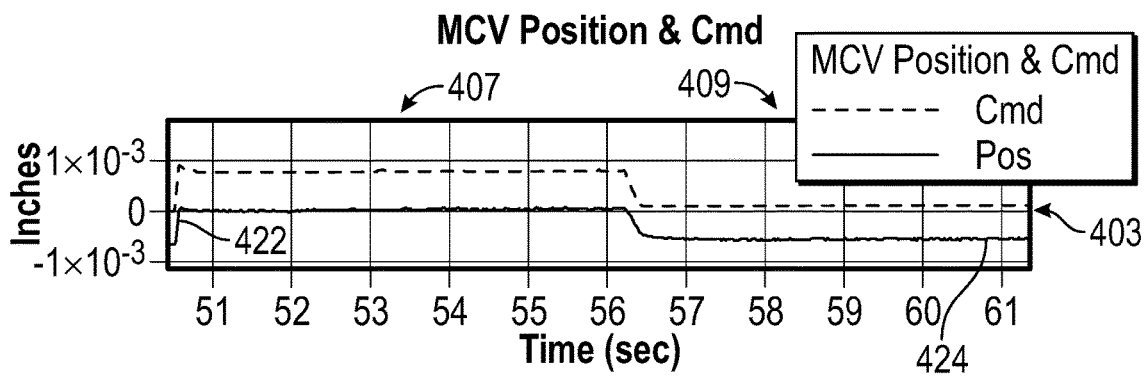
Figure 4C:
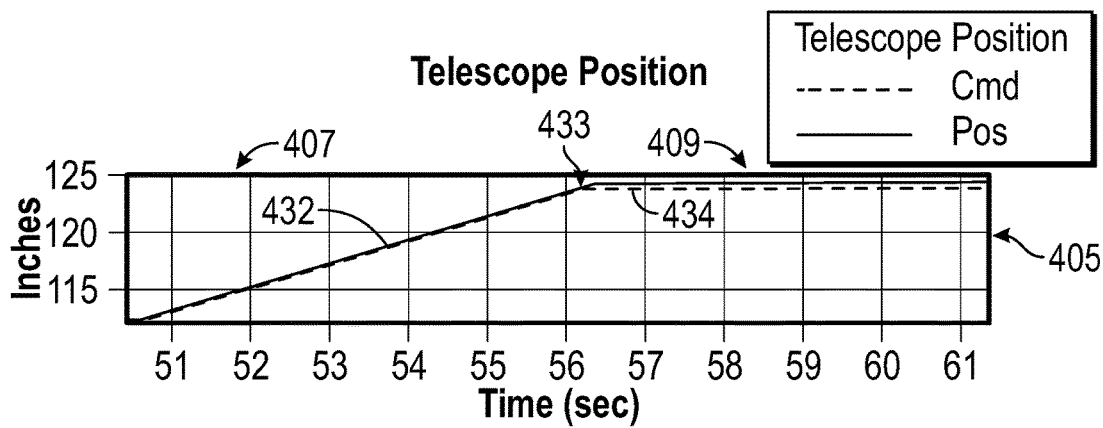

FIGS. 4A-C illustrate plots of an operating telescoping refueling boom system 100 in accordance with one or more embodiments of the disclosure. FIGS. 4A-C provide plots of telescoping refueling boom system 100 operating in telescoping tube rate control mode 407 and telescoping tube position control mode 409 in a laboratory setting. Plots 401, 403, and 405 shows the effectiveness of telescoping refueling boom system 100 to transition from a rate control mode to a position control mode and to arrest a telescoping tube 102 drift. To replicate flight conditions, tests were performed by applying tension to telescoping tube 102. For these tests, one thousand pounds was applied to represent boom weight (e.g., telescoping tube 102 weight) and internal fuel pressure at the in-flight deployed position of thirty degrees pitch down. A specific drift rate of two inches/second as illustrated by plot 401 of FIG. 4A was used to simulate the maximum expected telescoping tube rate determined by boom system modeling.

FIGS. 4A-C illustrate telescoping refueling boom system 100 operating in telescoping tube rate control mode 407 from approximately fifty one seconds to fifty six seconds and operating in telescoping tube position control mode 409 from approximately fifty six and two tenths seconds to sixty one seconds. Plot 401 of FIG. 4A illustrates an uncommanded telescoping tube drift rate 412 of approximately two inches/second during the time of telescoping tube rate control mode 407. Plot 405 of FIG. 4C shows telescoping tube 102 changing position along line 432 by a rate of approximately two inches/second during the same time period, and plot 403 shows a main control valve (MCV) response unchanged at zero inches along line 422 during the same time period.

Plots 401, 403, and 405 illustrate the transition from telescoping tube rate control mode 407 to telescoping tube position control mode 409 at approximately fifty six and two tenths seconds. Plot 401 shows telescoping tube drift rate 414 is reduced to approximately zero inches/second followed by an overshoot and settling back to zero. Plot 405 shows telescoping tube 102 position command set to a constant value equal to the tube length at the time of telescoping tube position control mode activation as depicted by arrow 433. Plot 403 illustrates actuator 231 MCV position is dynamically adjusted by processor 221 to approximately negative five ten-thousandths of an inch at line 424 in response to telescoping tube 102 continuing movement at the onset of telescoping tube position control mode activation (e.g., see plot 405 at arrow 433). In this regard, MCV position is adjusted to arrest telescoping tube 102 to within a position threshold limit.

As shown by plot 405, telescoping tube 102 at line 434 is arrested to within five tenths of an inch during telescoping tube position control mode. As plots 401-405 show, telescoping refueling boom system 100 transitioned from rate control mode to position control mode without a significant step response to actuator 231. Moreover, the telescoping tube position control mode 409 effectively held telescoping tube 102 position to within 5 tenths of an inch with an application of one thousand pounds tension.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more computer readable media. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A system comprising:
   a telescoping tube;
   an actuator coupled to the telescoping tube and configured to extend and/or retract the telescoping tube; and
   a processor coupled to the actuator and configured to select a telescoping tube rate control mode and/or a telescoping tube position control mode based on a telescoping tube current position error, a telescoping tube current rate of movement, and a value of a telescoping tube rate command to control the telescoping tube.

2. The system of claim 1, further comprising a telescoping tube control stick, wherein the telescoping tube control stick is configured to generate the telescoping tube rate command to extend and/or retract the telescoping tube in response to a user input.

3. The system of claim 1, further comprising a telescoping tube position error threshold limit to provide for a maximum allowable uncommanded telescoping tube displacement, wherein the processor is configured to select the telescoping tube rate control mode when the telescoping tube current position error exceeds the telescoping tube position error threshold limit.

4. The system of claim 3, further comprising a telescoping tube rate threshold limit to provide for a maximum telescoping tube rate of movement, wherein the processor is configured to select the telescoping tube rate control mode when a telescoping tube current rate of movement exceeds the telescoping tube rate threshold limit.

5. The system of claim 4, wherein the processor is configured to select the telescoping tube rate control mode when the telescoping tube rate command is a non-zero value.

6. The system of claim 1, wherein the processor is configured to set an actuator position command to a current position of the telescoping tube when the telescoping tube rate control mode is selected.

7. The system of claim 1, wherein the processor is configured to select the telescoping tube position control mode when:
   the current position error of the telescoping tube is within a telescoping tube position error threshold limit;
   the telescoping tube current rate of movement is within a telescoping tube rate threshold limit; and
   the telescoping tube rate command is an approximately zero value.

8. The system of claim 7, further comprising the processor is configured to select the telescoping tube position control mode when the actuator is reset.

9. The system of claim 1, wherein the actuator comprises a main control valve configured to extend and/or retract the telescoping tube, the actuator further comprises a direct drive electric motor, wherein the direct drive electric motor is configured to respond to the telescoping tube rate command to control the main control valve.

10. An aircraft comprising the system of claim 1, wherein the aircraft comprises:
    a fuselage; and
    a boom coupled to the fuselage and the telescoping tube, wherein the boom is configured to mechanically support the telescoping tube.

11. A method of using the system of claim 1, the method comprising:
    determining, by the processor, whether the telescoping tube current position error is within a telescoping tube position error threshold limit;
    determining, by the processor, whether a telescoping tube current rate of movement is within a telescoping tube rate threshold limit;
    determining, by the processor, whether the telescoping tube rate command is an approximately zero value; and
    selecting, by the processor, the telescoping tube rate control mode and/or the telescoping tube position control mode based on the telescoping tube current position error, the telescoping tube current rate of movement, and the telescoping tube rate command.

12. A method of incorporating the system of claim 1 into an aircraft, the method comprising:
    installing the telescoping tube, the actuator, and the processor, wherein:
    the telescoping tube is coupled to the actuator; and
    the actuator is coupled to the processor.

13. A method to control a telescoping tube, the method comprising:

determining whether a telescoping tube current position error is within a telescoping tube position error threshold limit;

determining whether a telescoping tube current rate of movement is within a telescoping tube rate threshold limit;

determining whether a telescoping tube rate command is an approximately zero value; and selecting a telescoping tube rate control mode and/or a telescoping tube position control mode based on the telescoping tube current position error, the telescoping tube current rate of movement, and the telescoping tube rate command.

14. The method of claim 13, further comprising generating the telescoping tube rate command via a telescoping tube control stick in response to a user input.

15. The method of claim 13, wherein selecting comprises selecting the telescoping tube rate control mode when the telescoping tube current position error exceeds the telescoping tube position error threshold limit.

16. The method of claim 15, wherein selecting comprises selecting the telescoping tube rate control mode when the telescoping tube current rate of movement exceeds the telescoping tube rate threshold limit.

17. The method of claim 16, wherein selecting comprises selecting the telescoping tube rate control mode when the telescoping tube rate command is a non-zero value.

18. The method of claim 13, further comprising setting an actuator position command to a telescoping tube current position when the telescoping tube rate control mode is selected.

19. The method of claim 13, wherein selecting comprises selecting the telescoping tube position control mode when:
   the telescoping tube current position error is within the telescoping tube position error threshold limit;
   the telescoping tube current rate of movement is within the telescoping tube rate threshold limit; and
   the telescoping tube rate command is an approximately zero value.

20. The method of claim 13, further comprising selecting the telescoping tube position control mode when an actuator is reset, the method further comprising extending and/or retracting the telescoping tube by a main control valve, wherein a direct drive electric motor controls the main control valve in response to the telescoping tube rate command.

* * * * *